Aug. 10, 1965     W. A. MINIX     3,199,201
AIR GAUGE HEAD
Filed Oct. 30, 1963
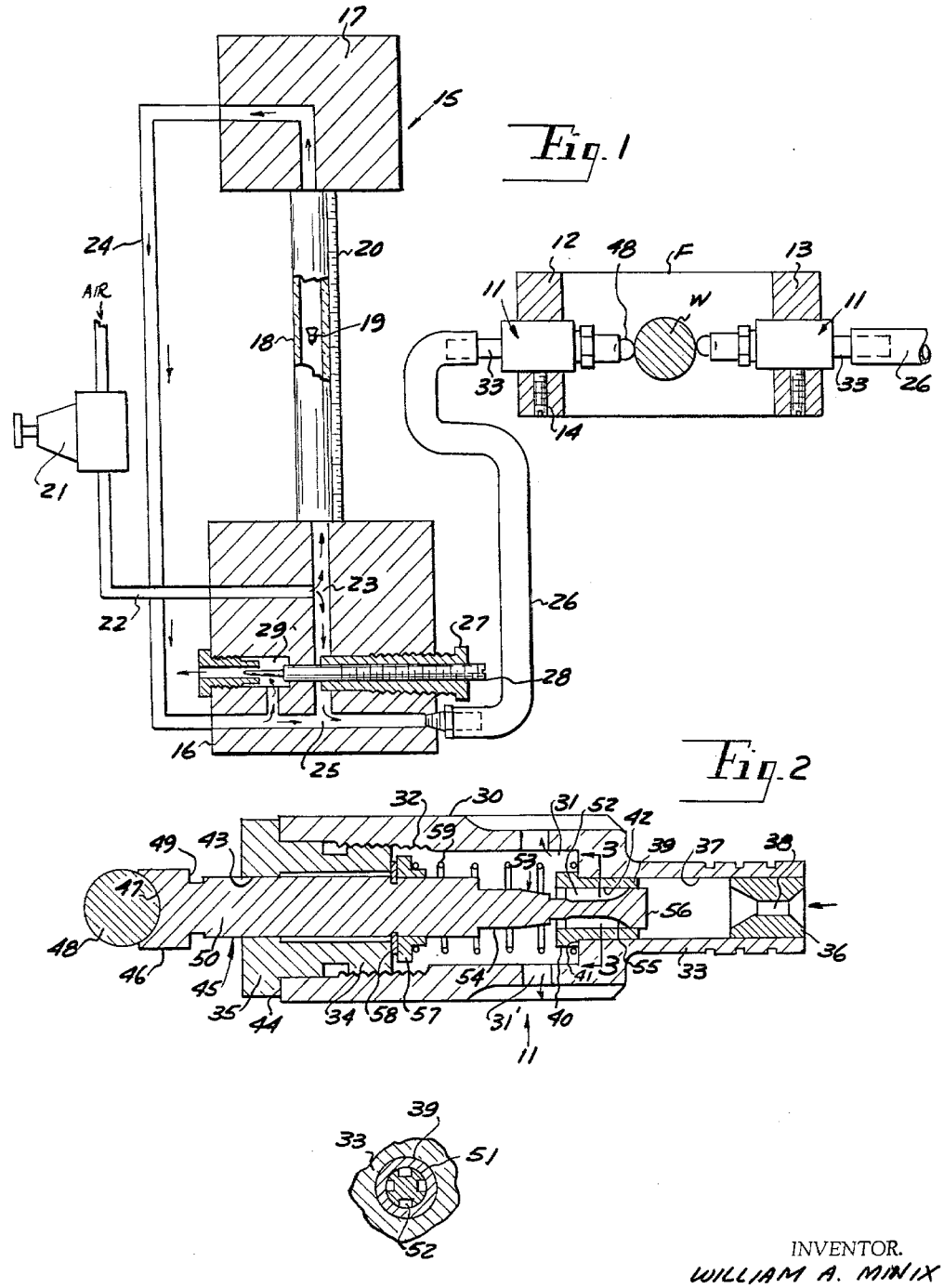
INVENTOR.
WILLIAM A. MINIX
BY Cullen, Sloman & Cantor
ATTORNEYS

United States Patent Office 3,199,201
Patented Aug. 10, 1965

3,199,201
AIR GAUGE HEAD
William A. Minix, Detroit, Mich., assignor to
Freeland Gauge Company, Detroit, Mich.
Filed Oct. 30, 1963, Ser. No. 320,043
2 Claims. (Cl. 33—172)

The present invention relates to an air gauge for controlling air bleeding in a pneumatic measuring circuit.

This invention is an improvement over the air gauge head defined in my co-pending application No. 294,024, filed July 10, 1963, now Patent 3,147,615.

Heretofore, various types of air gauges or gauge heads have been employed in circuits of this nature for the purpose of responding to the surface of the work piece for checking the dimensions thereof and wherein the deflection of the gauge element in responding to the surface of the work piece permits the bleeding of air through the gauge device in turn effecting the flow of air in a measuring circuit to give visible indication as to whether the work piece meets or does not meet a predetermined standard dimension within a predetermined range. One of the difficulties of air gauges of this type has been the excessive wastage of air through the gauge body when the gauge head is not in use.

It is therefore an object of this invention to provide an automatic shut-off valve within the air gauge so that air does not flow through the gauge body when the gauge is not in use. In the present construction air flows only when the gauge head is being used.

These and other objects will be seen from the following specification and claims in conjunction with the appended drawing in which:

FIG. 1 is a partly sectioned schematic view illustrating the present air gauge head as mounted in a fixture and used in conjunction with a pneumatic measuring air flow circuit.

FIG. 2 is a longitudinal section of the air gauge head on an increased scale.

FIG. 3 is a fragmentary section taken in the direction of arrows 3—3 of FIG. 2.

It will be understood that the above drawing illustrates merely a preferred embodiment of the invention, and that other embodiments are contemplated within the scope of the claims hereafter set forth.

PNEUMATIC MEASURING CIRCUIT

The present air gauge is employed in connection with a pneumatic air flow measuring circuit. In FIG. 1, a pair of the present air gauge heads 11 are mounted within blocks 12 and 13 of fixture F and secured at 14 in diametrically opposed relation, and between which work piece W is projected for gauging purposes.

The pneumatic measuring circuit includes an air flow gauge assembly generally indicated at 15 including valve body 16, tube support 17 with glass flow tube 18 interposed, within which the float 19 is movably positioned depending upon the rate of flow of air therethrough. A suitable indicating scale 20 is provided.

Air from a suitable source is directed through pressure regulator 21 for delivering air under pressure, such as at ten to twelve pounds per square inch, through conduit 22 to intake chamber 23 of the valve body. The air passes upwardly through tube 18, through support 17 and conduit 24 returning to delivery chamber 25 in the valve body, and thence through flexible plastic or other conduit 26 connected over inlet 33, FIG. 2, of one of the gauging heads 11, FIG. 1.

Associated with intake chamber 23 is a by-pass valve 27 adjustably mounted within valve body 16 for the purpose of by-passing some of the air from the intake chamber directly to delivery chamber 25 rather than through the glass tube 18. This is for the purpose of regulating the magnification factor of the air measuring system.

There is also provided concentrically with the by-pass valve a bleed valve 28 which controls the release of some of the air within delivery chamber 25 through passage 29 directly to atmosphere. This is an air bleed for adjusting float 19 within tube 18 under certain conditions and with a predetermined initial delivery pressure from regulator 21.

The detail of the construction and operation of said pneumatic measuring air flow circuit is more fully disclosed in my presently co-pending patent application executed June 7, 1963, Serial No. 290,526, filed June 25, 1963, now Patent 3,170,318.

AIR GAUGE HEAD

The present invention is particularly directed to the construction of the air gauge head 11, which is shown in fixture F for gauging purposes in FIG. 1, one of said gauge heads being indicated in detail in FIG. 2.

AIR GAUGE BODY

The air gauge head 11 includes elongated body 30 having an axial bore 31 and communicating therewith a series of transverse air outlets 31', said bore having a threaded portion 32 towards one end. The body includes at its opposite end an elongated air inlet 33 with axial internal bore 37.

Within the outer end of said inlet there is an economizer orifice, preferably constructed of brass, including body 36 snugly pressed within bore 37. Said body has an axial orifice or passage 38 by which air from tube 26 is directed into inlet 33.

BEARING NUT

The threaded shank 34 of bearing nut 35 engages the threaded portion 32 of bore 31, and the headed end portion of said nut engages the end of the body as at 44, FIG. 2.

Within the inner end of inlet 33 and adjacent bore 31, there is press fitted an intake bearing 39 of cylindrical shape. Bearing 39 has a central or cylindrical bore 42, and at one end the enlarged annular head 40 which engages shoulder 41 at the inner end of inlet 33 and relative to bore 31. The hollow open ended bearing nut 35 has an axial bore 43 which communicates with the interior bore or chamber 31 of the body.

STEM

The control mechanism of the present guage head is the elongated axial stem generally indicated at 45 which includes head 46 having a hemispherical recess 47 in its outer end. Within said recess is nested and fixedly secured the preferably carbide ball 48, also shown in FIG. 1, adapted for operative engagement with the surface of work piece W whose dimension is to be gauged.

The head 46 terminates in shoulder 49 which serves as a positive stop limiting inward movement of the stem with respect to the gauge body. Said shoulder merges with shank portion 50 of cylindrical shape which is slidably and guidably positioned within bore 43 of bearing nut 35.

AUTOMATIC AIR SHUT-OFF VALVE
INCORPORATED INTO STEM

The stem at its inner end includes as an extension thereof an axially movable spring-biased normally closed automatic air shut-off valve 56. Said valve is of cylindrical shape, normally nested within bore 42 of air inlet bearing 39 and closes off flow of air from inlet 33 through bearing 39 and into bore 31.

Exterior surface portions of valve body 56 have a series of elongated flutes 52 formed therein which are of decreasing radial depth towards the inner end of the valve body and run out to the outer annular surface thereof, as at 55, FIG. 2.

Valve 56 is adapted for unseating movement outwardly of air inlet bearing 39 upon inward movement of stem 45 relative to said body. This permits the flow of air from inlet 33, through the series of radially and outwardly directed flutes 52 into bore 31 for release through radial outlets 31' under the control of valve element 53.

AIR FLOW CONTROL VALVE ELEMENT

The cylindrical body portion 50 of stem 45 terminates in the reduced cylindrical extension 54 which in turn terminates in the annular outwardly and forwardly tapered flow control valve element 53 forming a part of the stem and arranged inwardly of shut-off valve 56. The flow control valve 53 in the inoperative position of the stem shown in FIG. 2 is spaced axially forward of air inlet bearing 39.

Upon initial application of stem 45 with work W causing said stem to move inwardly, the tapered air control valve element 53 moves inwardly relative to the outlet end of bore 42 in air inlet bearing 39. This variably regulates the flow of air therethrough. On sufficient inward movement of stem 45 the cylindrical portion 54 will completely close off the flow of air through inlet bearing 39.

STEM AND AIR INLET VALVE BIASING ASSEMBLY

Annular stop collar 57 is mounted over cylindrical portion 50 of stem 45 and is retained against movement in one direction by snap ring 58, which is nested within an annular groove formed in stem portion 50. The coiled spring 59 extends axially around the stem within bore 31, at one end engages stop collar 57 and its opposite end bears against the end wall of the body adjacent one end of bore 31, adjacent and concentric to air inlet bearing 39. The ring 58 serves an additional function of limiting outward disassembly movement of stem 45 relative to the body.

The spring biasing assembly above described performs two functions:

(1) The spring functions through stop collar 57 to bias stem 45 outwardly to the inoperative position shown in FIG. 2, and at the same time resists inward movement of the stem when engaged by work piece W, FIG. 1. Accordingly, there is a constant outward bias of stem 45 relative to the work piece so that said stem at its outer end operatively engages and follows the contour of said work piece.

(2) The coiled spring 59 serves the further function in biasing the stem outwardly so as to maintain the air control valve 56, normally seated or nested snugly but slidably within bore 42 of air inlet bearing 39. This cuts off the flow of air from inlet 33 into bore 31 when the valve head is not in use in a gauging operation such as in the position shown in FIG. 2.

When the gauge head is placed into operation FIG. 1, and the stem 50 moved inwardly from the position shown in FIG. 2, just as soon as valve 56 has been moved inwardly sufficiently so that the run out end portions 55 of flutes 52 are uncovered and extend outwardly of air inlet bearing 39, air may then flow from inlet 33 through the inlet bearing and into chamber 31 for exhausting through outlets 31'.

The quantity of air which will flow through bearing 39 is thereafter regulated by the positioning of the tapered valve element 53 relative to the outlet end of bearing 39 to thus variably regulate the flow of air through the gauge head and thence to atmosphere.

The automatic shut-off valve 56 normally does not effect the operation of the air gauge itself since it merely closes off the flow of air through the gauge body when the gauge is not in use. Once the stem 45 has been activated by work piece W, FIG. 1, and is projected inwardly, the shut-off valve 56 is unseated as at 55, FIG. 2, and thereafter the control of air flow through the body and particularly through air intake bearing 39 is regulated by the annular outwardly tapered valve element 53.

It is the longitudinal positioning of this valve element 53, FIG. 2, which variably regulates the rate of air flow through the gauge body and out through apertures 31' in turn modifying the air flow in the measuring circuit 15 of FIG. 1.

Having described my invention, reference should now be had to the following claims.

I claim:

1. In an air gauge for controlling air bleeding in a pneumatic measuring circuit and including
   an elongated body having a bore, radial air outlets communicating with the bore and an elongated air inlet;
   a cylindrical air inlet bearing in said inlet communicating with said bore;
   a hollow open ended bearing nut projected into said bore at and engaging one end of the body;
   a work piece engaging stem axially mounted within the body and adjacent its opposite ends guidably, slidably and axially journalled respectively in said intake bearing and said bearing nut; the improvement comprising:
   an axially movable spring biased normally closed automatic air shut-off valve of cylindrical shape snugly and slidably positioned within said air inlet bearing and joined to said stem, surface portions of said valve having a series of elongated flutes communicating with the inlet bearing bore, said valve adapted for unseating movement outwardly of said inlet bearing upon inward movement of said stem relative to said body, permitting flow of air from said inlet, through said flutes and into said bore;
   and an annular outwardly and forwardly tapered flow control valve element on said stem inwardly of said air shut-off valve movable into said inlet bearing for variably regulating the rate of air flow therethrough.

2. In the air gauge defined in claim 1, the inner ends of said flutes running out to the outer surface of said valve and communicating with said inlet after initial inward movement of said stem.

References Cited by the Examiner

UNITED STATES PATENTS 2,831,257   4/58   Aller.

ISAAC LISANN, *Primary Examiner.*